United States Patent Office 2,714,608
Patented Aug. 2, 1955

2,714,608

POLYETHOXY ESTERS OF ISOCYCLIC ORGANIC CARBOXYLIC ACIDS

Max Matter, Worb, near Bern, Switzerland, assignor to Ciba Pharmaceutical Products, Inc., Summit, N. J.

No Drawing. Application September 15, 1953, Serial No. 380,337

Claims priority, application Switzerland February 15, 1950

6 Claims. (Cl. 260—471)

This application is a continuation-in-part of my copending application Serial No. 210,796 filed February 13, 1951.

Esters of high molecular fatty acids and polyethylene glycols or polyethylene glycol monoalkyl ethers are known; these compounds possess surface-active properties and are used as wetting agents, detergents and emulsifiers.

From experiments made by the applicant it became clear that certain groups of esters from isocyclic carboxylic acids and polyethylene glycols or polyethylene glycol monoethers have excellent pharmacological properties and that they can for instance be used as infiltration anesthetics, spasmolytics, analeptics and bacteriostatics. Such surprising effects are remarkable because, for instance for the preparation of spasmolytics, the simultaneous use of aminoalcohols or other nitrogen containing compounds was thought necessary.

The main object of my said copending application is concerned with new compounds corresponding to the general formula

R.O(CH₂.CH₂.O)ₙCH₂.CH₂.O.X wherein

R means hydrogen or a hydrocarbon radical having at most 6 carbon atoms, n Means 4 to 50 inclusive and X means the radical of a carboxylic acid containing at least one isocyclic ring.

The present invention, as is manifest from the appended claims, relates more particularly to compounds of the above formula, wherein R stands for hydrogen or a saturated hydrocarbon radical having at most 6 carbon atoms, or the phenyl radical and n is an integer from 4 to 50 and X stands for a radical of the formula

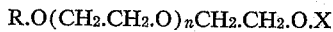

R' represents hydrogen or advantageously a saturated hydrocarbon radical having at most 6 carbon atoms or the phenyl radical.

These new esters possess valuable pharmacological properties. More especially they show a local anesthetic effect. They are intended for use as medicaments or as intermediates for the preparation of medicines.

Of especial value are the esters of the formula

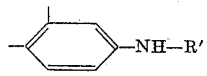

wherein R represents hydrogen or advantageously an alkyl radical having 1 to 6 carbon atoms, such as ethyl, propyl, butyl, or hexyl, advantageously methyl, R' stands for an alkyl radical having 1 to 6 carbon atoms, advantageously butyl or amyl and n is an integer from 4 to 50, advantageously 7 to 18. Most important are the esters of the formula

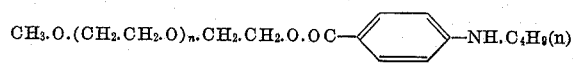

wherein n is an integer from 16–18, for example has an average value of about 16.

The new esters are obtained by esterifying the said carboxylic acids or their functional derivatives with polyethylene glycols or with polyethyene glycol monoethers. The esterification can be carried out directly or the carboxylic acid can be esterified over the acid chloride or the acid anhydride, for instance according to Schotten-Baumann, or in the presence of pyridine. In some other instances it is more convenient to apply the re-esterification method.

The starting materials used are known or can be prepared by conventional methods. The polyethyleneglycols used have the formula

wherein n stands for 4 to 50 inclusive and R stands for hydrogen or a saturated hydrocarbon radical having at most 6 carbon atoms or the phenyl radical.

If for instance R stands for isobutyl the polyethylene glycol derivative is obtained by reacting ethylene glycol monoisobutyl ether with n moles of ethylene oxide in a pressure vessel at a temperature of 160° to 170° C. in the presence of a catalytic amount of potassium hydroxide.

The following examples serve to illustrate and explain the present invention without, however, being restrictive. The relationship of parts by weight to parts by volume is that of kilograms to liters.

Example 1

270 parts by weight of a mixture of hydnocarpic acid and chaulmoogric acid (obtained by saponification of chaulmoogra oil) of the average molecular weight 270 and a mixture of 360 parts by weight of polyethylene glycol monomethyl ether of the average molecular weight 350 and 15 parts by weight of 65% sulfuric acid are heated together at a temperature of 120° C. while introducing a stream of nitrogen, until a sample is soluble in cold water; this takes 1 to 3 hours. For purification the mixture is vigorously stirred with 600 parts by weight of alumina and 3000 parts by volume of benzene for 1 hour. After filtration and washing of the alumina with benzene the filtrate is evaporated. The remaining residue consists of a mixture of the esters of the hydnocarpic and chaulmoogric acids of polyethylene glycol monomethyl ether in the form of a light yellow oil which is easily soluble in water and in nearly all organic solvents with the exception of ether and of aliphatic hydrocarbons. The new ester shows excellent tuberculostatic properties and is only slightly toxic for warm blooded animals.

The above mentioned mixture of hydnocarpic and chaulmoogric acids was produced from commercial hydnocarpic oil in the following way. By saponification the raw acid mixture was first obtained which was purified after conversion into the methyl ester, by distillation under 0.1 mm. pressure at a temperature of 125° to 135° C. By saponification with sodium hydroxide in 80% isopropanol the acid mixture was obtained as a soft white mass.

Esters with similar properties are obtained if, instead of polyethylene glycol monomethyl ether having the average molecular weight 350, equimolecular quantities of polyethylene glycol monopropyl, isopropyl, butyl or isobutyl ether of the average molecular weight 500 to 2200 are used. If the esterification is applied to a polyethylene glycol monomethyl ether of the average molecular weight 250 an ester is obtained which is not soluble at a temperature of 37° C. but which is easy to emulsify.

Example 2

35 parts by weight of β-benzoylacrylic acid and 70 parts by weight of polyethylene glycol of the average molecular weight 300 and 300 parts by volume of benzene are mixed, treated with 2.5 parts of 60% sulfuric acid and boiled under reflux for 20 hours using a separator for the water which is evaporated with the benzene vapours. Then it is rinsed with benzene in a separating funnel, washed once with a half-saturated sodium chloride solution and three times with saturated sodium hydrogen carbonate (NaHCO₃) solution. By evaporation of the benzene solution the raw polyethylene glycol ester of the benzoylacrylic acid is obtained as a light brown oil. It is soluble in five times the amount of water and has disinfecting properties.

The raw material thus obtained can be purified as follows: After dissolution in six times the amount of water it is shaken with twice the quantity of active charcoal for half an hour and then filtered over "Celit 535" (diatomaceous earth) in a chromatographic column and washed with water, whereby almost the whole amount of ester will be adsorbed on the active carbon. By eluation with an acetone-water-mixture in the ratio of 1:2 a pure ester is obtained as a light oil which is, in contradistinction to the raw material, clearly soluble in ten to a hundred times the amount of water.

According to the above described method it is possible to esterify also diphenyl-4-carboxylic acid, 4'-chlorodiphenyl ether-4-carboxylic acid and diphenylmethane-4-carboxylic acid with polyethylene glycol monoalkyl ethers.

Example 3

35 parts by weight of β-benzoylacrylic acid, 2.5 parts by weight of p-toluene sulfonic acid and 80 parts by weight of polyethylene glycol monomethyl ether of the average molecular weight 350 are boiled under reflux in 300 parts by volume of benzene for 14 hours using a continuous water-separator.

The benzene solution is thereupon extracted several times with a saturated sodium hydrogen carbonate solution, all aqueous extracts being washed once with benzene. By evaporation of the benzene solutions there is obtained the benzoylacrylic ester of the polyethylene glycol monomethyl ether in the form of a light yellow, water-soluble oil.

The new ester shows in vitro a strong tuberculostatic activity and has an insignificant toxicity for warm blooded animals.

Instead of polyethylene glycol mono-methyl ether one can analogically esterify also polyethylene glycol cyclopentyl ether, polyethylene glycolcyclohexyl ether and polyethylene glycol phenyl ether with β-benzoylacrylic acid, valuable new compounds being thus obtained.

Example 4

8.25 parts by weight of ethyl p-aminobenzoate, 35 parts by weight of commercial polyethylene glycol monomethyl ether of the average molecular weight 350 (dried in a high vacuum at 110° C.) and 4 parts by volume of a 2-normal sodium methylate solution in methanol are heated for 16 hours in vacuo under a pressure of 12 mm. of mercury at a temperature of 100° C. After this time a sample of the light brown oil taken from the reaction vessel is almost quantitatively water-soluble. The whole is poured into 250 parts by volume of water to which are added 5 parts by volume of a 2-n hydrochloric acid. After the addition of one part by volume of a saturated sodium bisulfite solution the mixture is adjusted to a pH 7.5 and shaken with 6 parts by weight of animal charcoal for one hour. The charcoal having been filtered off the filtrate is shaken several times with benzene. All the benzene extracts are washed three times with a saturated sodium hydrogen carbonate solution and evaporated. The excess of polyethylene glycol monomethyl ether is present in the aqueous layers and the p-aminobenzoic acid ester of the polyethylene glycol monomethyl ether is obtained, on evaporation of the benzene solutions, in the form of a light yellow, clear oil. The new ester is soluble in water and can be used as local anesthetic.

The same ester can also be obtained by catalytic hydrogenation of the p-nitrobenzoyl ester of polyethylene glycol monomethyl ether.

Using the same alcoholysis operation the p-butyl-aminobenzoyl ester of polyethylene glycol monomethyl ether can also be obtained.

Example 5

4.65 parts by weight of cinnamic acid chloride and 8.1 parts by weight of polyethylene glycol monomethyl ether of the average molecular weight 350 (dried at 110° C. in a high vacuum) are heated in 25 parts by volume of absolute pyridine for one hour to 100° C. After cooling it is poured on a mixture of 32 parts by volume of concentrated hydrochloric acid and 160 parts by weight of finely divided ice. Thereupon it is rinsed with 200 parts by volume of chloroform in a separating funnel and the chloroform solution washed each time twice with 2-n hydrochloric acid, a saturated sodium hydrogen carbonate solution and a half-saturated sodium chloride solution. On evaporation of the chloroform solution the raw cinnamic acid ester of polyethylene glycol monomethyl ether remains in the form of a light brown oil. It can be purified by treating it with a small amount of animal charcoal in an aqueous solution.

The new ester can be used as infiltration anesthetic. The benzoic acid ester and the p-methylbenzoic acid ester are obtained in an analogous way, both having local anesthetic properties.

Example 6

23.1 parts by weight of diphenylacetyl chloride and 50 parts by weight of polyethylene glycol monoethyl ether of the average molecular weight 500 are heated with 150 parts by weight of pyridine for one hour to 100° C. After cooling it is poured on a mixture of 300 parts by weight of finely divided ice and 170 parts by weight of concentrated hydrochloric acid. The mixture is then rinsed with 900 parts by volume of benzene in a separating funnel. After the discharge of the aqueous layer the benzene solution is extracted each time twice with 2-n hydrochloric acid, 2-n sodium carbonate solution and with a half-saturated sodium chloride solution; all the aqueous solutions are washed in a second separating funnel with 400 parts by volume of benzene. On evaporation of the benzene solutions there remains a colorless oil which solidifies into a wax-like mass if allowed to stand for a long time, this mass being the diphenylacetic acid ester of polyethylene glycol monoethyl ether which is clearly soluble in water and which has spasmolytic properties. The new substance differs from the usual spasmolytics by the absence of basic groups from the molecule.

Phenyl cyclohexyl acetyl chloride can be esterified in an analogous way with polyethylene glycol monohexyl ether.

Example 7

21 parts by weight of phenyl cyclopentane-1-carboxylic acid chloride having a boiling point of 135° C. (10 mm. Hg), 35 parts by weight of dry technical polyethylene glycol monomethyl ether of the average molecular weight 350 and 150 parts by weight of absolute pyridine are mixed and heated to 110° to 120° C. After 5 minutes it is cooled to room temperature and allowed to stand for 10 hours. A copious white crystalline precipitate is being formed. By a short heating the whole is brought into solution again. The whole reaction mass is then poured on a mixture of 300 parts by weight of finely divided ice and 170 parts by volume of concentrated hydrochloric acid. The whole is rinsed with 600 parts by volume of benzene in a separating funnel, the aqueous layer isolated, the benzene solution extracted each time twice with 2-n hydrochloric acid and a saturated sodium hydrogen carbonate solution. The aqueous layers are washed once with fresh benzene. The combined benzene solutions which have been dried with sodium sulfate are evaporated. The phenyl cyclopentane-1-carboxylic acid ester of the polyethylene glycol monomethyl ether is left as a colorless oil which is easily soluble in chloroform, toluene, alcohol and acetone. The new ester is soluble in water at temperatures below about 30° C.; on heating it is separated from the aqueous solution. As the polyethylene glycol monomethyl ether used for the esterification consists of a mixture of substances with different degrees of polymerisation the molecular weight of the new ester may also vary within a certain range. The higher molecular portions can be separated from the low molecular portions by physical methods. For this purpose one may proceed as follows:

3.82 grams of the ester produced according to this example are dissolved in 100 cc. of water and extracted three times with 100 cc. of ether. The ethereal solutions are washed three times with 30 cc. of water. The ethereal solutions dried over sodium sulfate and evaporated, whereupon 3.10 grams of ester remain which can partly be precipitated from an aqueous solution by heating it to over 30° C. From the aqueous solutions 0.70 gram of ester can be isolated by extraction with chloroform; the ester is then precipitated from an aqueous solution only on heating it up to a temperature of over 60° C.; this fraction contains the higher molecular portions.

The new ester is a valuable spasmolytic.

*Example 8*

Commercial polyethyleneglycol monomethyl ether of average molecular weight 750 is dissolved in 7 times its weight of water, and after the addition of 5% of active carbon the mixture is shaken for half-an-hour and filtered. The purified polyethyleneglycol monomethyl ether is extracted from the filtrate with chloroform and on evaporation of the chloroform solution and drying in a high vacuum at 90° C. is obtained in the form of a colorless mass, wax-like at room temperature.

150 parts by weight of the purified ether so obtained are placed with 22.1 parts by weight of ethyl 4-butylaminobenzoate in a closed reaction vessel provided with a regulatable inlet for solvent and with an arrangement for distilling off in vacuo. The mixture is heated for an hour at 100–105° C., and at a vacuum of 12 mm. Hg absolute xylene is led in under the surface of the mixture. In this way a constant stream of xylene vapour is maintained through the whole apparatus, and the last traces of moisture and liquid impurities are removed. The xylene is condensed and collected. To the residue, cooled at 20–30° C. 0.25 part by weight of sodium methoxide dissolved in 2 parts by weight of methanol is added. Thereafter, again in vacuo at 100–105° C., xylene is led through, whereby all methanol and the ethanol formed during esterification are removed. Esterification is allowed to proceed under these conditions until a sample of the reaction mass dissolves in water to a clear solution, which occurs after 2–3 hours. There is thus obtained in almost quantitative yield the ester $4\text{-n-}C_4H_9NH.C_6H_4.CO.O.CH_2.CH_2.(O.CH_2.CH_2)_n.OCH_3$ $n$ having an average value of about 16. The product still contains excess of polyethyleneglycol monomethyl ether. For its purification it is dissolved in benzene and washed several times with 5% soda solution. It is desirable to shake all washings with fresh benzene. The new ester is found in the benzene extracts, the excess of polyethyleneglycol and a small amount of brown impurities remain in the dilute soda solution. By evaporation of the dried and filtered benzene solution the new ester is obtained as a colorless or very feebly yellow mass which sets at room temperature to a wax-like solid. From aqueous solutions the new ester is precipitated on warming to 70° C., and redissolves easily on cooling. It is particularly suitable for therapeutic anaesthesia. Its aqueous solutions are stable and can be sterilised.

In similar manner polyethyleneglycols and their monomethyl ethers of greater or smaller molecular weight can be esterified with ethyl 4-butylaminobenzoate. If a polyethyleneglycol monomethyl ether mixture of boiling point 185–215° C./0.005 mm. is esterified, there is obtained an ester mixture which is soluble in water below about 41° C. to a clear solution. By esterification with a large excess of polyethyleneglycol of boiling point 185–215° C./0.005 mm. there is obtained an ester of the formula $4\text{-n-}C_4H_9.NH.C_6H_4.CO.O.CH_2.CH_2.(O.CH_2.CH_2)_n.OH$ in which $n$ is from 4 to 8. This is soluble in water below 42° C.

*Example 9*

4.42 parts of para-butylamino-benzoic acid ethyl ester are put with 29.5 parts of a mixture of polyethylene glycol boiling at 180–220° C. at a pressure of 0.01 mm. of mercury into a closed reaction vessel which is fitted with an adjustable inlet tube for solvents and a connection for distilling off in vacuo. In order to dry the mixture completely it is heated for an hour at 100–105° C. and absolute xylene is introduced under the surface of the mixture in vacuo at a pressure of 12 mm. of mercury. There is thus a constant stream of xylene steam passing through the whole apparatus which removes the last traces of moisture and any other volatile impurities. The xylene is condensed in a cooler. The whole is cooled to 20–30° C. and 0.06 part of sodium methylate dissolved in 0.6 part of methanol is added. Thereupon xylene is introduced again in vacuo at a temperature of 100–105° C. whereby all the methanol and the ethanol formed during re-esterification evaporates. The re-esterification is continued under these conditions until a specimen of the reaction mass is clearly soluble in cold water, which occurs after about 2–3 hours. There is now obtained in almost quantitative yield the ester of the formula $$HO(CH_2.CH_2.O)_nCH_2.CH_2.O.OC-\langle\ \rangle-NH.C_4H_9(n)$$

wherein $n$ stands for approx. 6 to 8, which still contains an excess of polyethylene glycol. The ester is purified by dissolving in benzene and being washed several times with a sodium carbonate solution of 5 per cent. strength. It is advantageous to agitate all the washing solutions with fresh benzene. In this distribution between benzene and soda solution the new ester remains in the benzene; the excess polyethylene glycol and a small amount of brown impurities are taken up by the dilute sodium carbonate solution. By evaporating the dried and filtered benzene solution there is obtained the new ester in the form of a colorless to very faintly pale yellow oil which is easily soluble in most organic solvents with the exception of aliphatic hydrocarbons. The new ester is precipitated from aqueous solutions when heated to about 42° C., but it dissolves again readily on cooling. The new ester is extremely suitable for use as an anesthetic. Aqueous solutions are stable and can be sterilized.

*Example 10*

4.42 parts of para-butylamino-benzoic acid ethyl ester are put with 16.0 parts of a mixture of polyethylene glycol monomethyl ethers, boiling at 180–220° C. at a pressure of 0.01 mm. of mercury, in a closed reaction vessel which is fitted with an adjustable inlet tube for solvents and a connection for distilling off in vacuo. In order to dry the mixture completely, it is heated for an hour at 100–105° C. and absolute xylene is introduced under the surface of the mixture in vacuo at a pressure of 12 mm. of mercury. There is thus a constant stream of xylene steam passing through the whole apparatus, which removes the last traces of moisture and any other volatile impurities. The xylene is condensed in a cooler. The whole is cooled to 20–30° C. and 0.06 part of sodium methylate dissolved in 0.6 part of methanol is added. Thereupon xylene is introduced again in vacuo at a temperature of 100–105° C. whereby all the methanol and the ethanol formed during re-esterification evaporates. The re-esterification is continued under these conditions until a specimen of the reaction mass is clearly soluble in cold water, which occurs after about 2–3 hours. There is now obtained in almost quantitative yield the ester of the formula

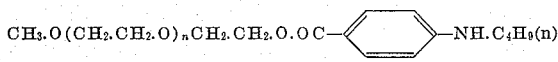

wherein $n$ stands for approx. 7 to 9, which still contains an excess of polyethylene glycol monomethyl ether. The ester is purified by dissolving in benzene and being washed several times with a sodium carbonate solution of 5 per cent. strength. It is advantageous to agitate all the washing solutions with fresh benzene. In this distribution between benzene and sodium carbonate solution the new ester remains in the benzene, the excess polyethylene glycol monomethyl ether and a small amount of brown impurities are taken up by the dilute soda solution. By evaporating the dried and filtered benzene solution there is obtained the new ester in the form of a colorless to very faintly yellow oil which is easily soluble in most organic solvents with the exception of aliphatic hydrocarbons. The new ester is precipitated from aqueous solutions when heated to about 42° C., but it dissolves again readily on cooling. The new ester is extremely suitable for use as an anesthetic. Aqueous solutions are stable and can be sterilised.

*Example 11*

4.42 parts of para-butylamino-benzoic acid ethyl ester are put with 13.6 parts of a mixture of polyethylene glycol monomethyl ethers boiling at 140–180° C. at a pressure of 0.01 mm. of mercury, in a closed reaction vessel which is fitted with an adjustable inlet tube for solvents and a connection for distilling off in vacuo. In order to dry the mixture completely, it is heated for an hour at 100–105° C. and absolute xylene is introduced under the surface of the mixture in vacuo at a pressure of 12 mm. of mercury. There is thus a constant stream of xylene steam passing through the whole apparatus, which removes the last traces of moisture and any other volatile impurities. The xylene is condensed in a cooler. The whole is cooled to 20–30° C. and 0.06 part of sodium methylate dissolved in 0.6 part of methanol is added. Thereupon xylene is introduced again in vacuo at a temperature of 100–105° C. whereby all the methanol and the ethanol formed during re-esterification evaporates. The re-esterification is continued under these conditions until a specimen of the reaction mass is clearly soluble in cold water, which occurs after about 2–3 hours. There is now obtained in almost quantitative yield the ester of the formula

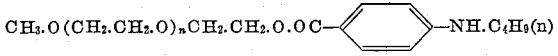

wherein $n$ stands for approx. 5 to 7, which still contains an excess of polyethylene glycol monomethyl ether. The ester is purified by dissolving in benzene and being washed several times with a sodium carbonate solution of 5 per cent strength. It is advantageous to agitate all the washing solutions with fresh benzene. In this distribution between benzene and sodium carbonate solution the new ester remains in the benzene, the excess polyethylene glycol monomethyl ether and a small amount of brown impurities are taken up by the dilute soda solution. By evaporating the dried and filtered benzene solution there is obtained the new ester in the form of a colorless to very faintly yellow oil which is easily soluble in most organic solvents with the exception of aliphatic hydrocarbons. The new ester is precipitated from aqueous solutions when heated to about 30° C., but it dissolves again readily on cooling. The new ester is extremely suitable for use as an anesthetic. Aqueous solutions are stable and can be sterilized.

*Example 12*

4.42 parts of para-butylamino-benzoic acid ethyl ester are put with 32 parts of a commercial mixture of polyethyleneglycols having an average molecular weight of 400 in a closed reaction vessel which is fitted with an adjustable inlet tube for solvents and a connection for distilling off in vacuo. In order to dry the mixture completely, it is heated for an hour at 100–105° C. and absolute xylene is introduced under the surface of the mixture in vacuo at a pressure of 12 mm. of mercury. There is thus a constant stream of xylene steam passing through the whole apparatus, which removes the last traces of moisture and any other volatile impurities. The xylene is condensed in a cooler. The whole is cooled to 20–30° C. and 0.06 part of sodium methylate dissolved in 0.6 part of methanol is added. Thereupon xylene is introduced again in vacuo at a temperature of 100–105° C. whereby all the methanol and the ethanol formed during re-esterification evaporates. The re-esterification is continued under these conditions until a specimen of the reaction mass is clearly soluble in cold water, which occurs after about 2–3 hours. There is now obtained in almost quantitative yield the ester of the formula

wherein $n$ stands for an average value of about 8, which still contains an excess of polyethylene glycol. The ester is purified by dissolving in benzene and being washed several times with a sodium carbonate solution of 5 per cent strength. It is advantageous to agitate all the washing solutions with fresh benzene. In this distribution between benzene and sodium carbonate solution the new ester remains in the benzene, the excess polyethylene glycol, and a small amount of brown impurities are taken up by the dilute soda solution. By evaporating the dried and filtered benzene solution there is obtained the new ester in the form of a colorless to very faintly yellow oil which is easily soluble in most organic solvents with the exception of aliphatic hydrocarbon. The new ester is precipitated from aqueous solutions when heated to about 52° C., but it dissolves again readily on cooling. The new ester is extremely suitable for use as an anesthetic. Aqueous solutions are stable and can be sterilized.

*Example 13*

4.42 parts of para-butylamino-benzoic acid ethyl ester are put with 17.2 parts of nonaethylene glycol monomethyl ether boiling at 190° C. at a pressure of 0.01 mm. of mercury, in a closed reaction vessel which is fitted with an adjustable inlet tube for solvents and a connection for distilling off in vacuo. In order to dry the mixture completely, it is heated for an hour at 100–105° C. and absolute xylene is introduced under the surface of the mixture in vacuo at a pressure of 12 mm. of mercury. There is thus a constant stream of xylene steam passing through the whole apparatus, which removes the last traces of moisture and any other volatile impurities. The xylene is condensed in cooler. The whole is cooled to 20–30° C. and 0.06 part of sodium methylate dissolved in 0.6 part of methanol is added. Thereupon xylene is introduced again in vacuo at a temperature of 100–105° C. whereby all the methanol and the ethanol formed during re-esterification evaporates. The re-esterification is continued under these conditions until a specimen of the reaction mass is clearly soluble in cold water, which occurs after about 2–3 hours. There is now obtained in almost quantitative yield the ester of the formula

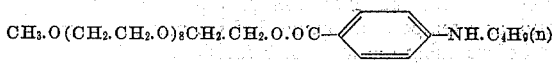
CH₃.O(CH₂.CH₂.O)₈CH₂.CH₂.O.OC—⟨ ⟩—NH.C₄H₉(n)

which still contains an excess of nona ethylene glycol monomethyl ether. The ester is purified by dissolving in benzene and being washed several times with a sodium carbonate solution of 5 per cent strength. It is advantageous to agitate all the washing solutions with fresh benzene. In this distribution between benzene and sodium carbonate solution the new ester remains in the benzene, the excess nona ethylene glycol monomethyl ether and a small amount of brown impurities are taken up by the dilute soda solution. By evaporating the dried and filtered benzene solution there is obtained the new ester in the form of a colorless to very faintly yellow oil which is easily soluble in most organic solvents with the exception of aliphatic hydrocarbons. The new ester is precipitated from a 10% aqueous solution when heated to 45° C., but it dissolves again readily on cooling. The new ester is extremely suitable for use as an anesthetic. Aqueous solutions are stable and can be sterilized.

The nonaethyleneglycol monomethyl ether used as starting material corresponds to the formula

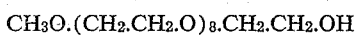
CH₃O.(CH₂.CH₂.O)₈.CH₂.CH₂.OH and can be prepared as follows:

530 parts by weight of benzene-sulfonic acid ester of di-ethyleneglycol-monomethylether are allowed to run in the course of 4 hours at 100° C. while stirring into a solution of 50 parts by weight of sodium in 800 parts by volume of triethyleneglycol and the reaction mixture is kept over night at 100° C. After cooling, 500 parts by volume of water and 1000 parts by volume of chloroform are added and the whole well agitated. The chloroform layer is extracted twice with 250 parts by volume of water each time and then evaporated. There are left 220 parts by weight of crude pentaethyleneglycol-monomethylether. By extracting the three water layers 5 times with 500 parts by volume of chloroform each time there are obtained a further 250 parts by weight of crude pentaethyleneglycol-monomethylether. From the crude product there is obtained 400 parts by weight of pure ether as colorless oil by distillation under 0.01 mm. pressure of mercury and at 110° C.

50 parts by weight of pentaethyleneglycol-monomethylether are dissolved in 100 parts by volume of benzene. 35 parts by volume of benzene sulfochloride are added dropwise to the solution during half an hour while stirring and cooling to 20–30° C. At the same time 15 parts by weight of pulverized sodium hydroxide are introduced in equal portions. The whole is stirred for a further 2½ hours and then allowed to stand without stirring over night. The precipitated salts are removed by filtering with suction, and the filtrate is agitated with 20 parts by volume of aqueous ammonia of 25% strength for 4 hours. Any remaining benzene-sulfochloride is thus converted into the alkali-soluble sulfamide. 50 parts by volume of caustic soda solution of 10% strength are added and the whole is well agitated. The aqueous layer is extracted again with 150 parts by volume of benzene and the two benzene extracts are washed consecutively with 50 parts by volume of caustic soda solution of 10% strength and 50 parts by volume of water. By evaporating the dried benzene solution there are obtained 70 parts by weight of benzene-sulfonic acid ester of pentaethyleneglycol-monomethylether free from solvent as an almost colorless oil.

40 parts by weight of the benzene-sulfonic acid ester of pentaethyleneglycol-monomethylether are introduced dropwise in the course of an hour while stirring at 100° C. into a solution of 2.3 parts by weight of sodium in 95 parts by volume of diethyleneglycol and the reaction mixture is kept at 100° C. over night. After coding, 250 parts by volume of water are added and the whole then well agitated with 100 parts by volume of chloroform. It is then extracted a further 7 times with 100 parts by volume of chloroform each time and the chloroform extracts are washed separately 4 times with 100 parts by volume of water each time. On evaporation the chloroform extracts leave behind 32 parts by weight of an oily residue, from which 29.5 parts by weight of heptaethyleneglycol monomethylether are distilled in high vacuum under a pressure of 0.005 mm. and at 150° C. as a colorless oil.

25.6 parts by weight of heptaethyleneglycol-monomethylether are dissolved in 35 parts by volume of benzene and 13.5 parts by volume of benzene-sulfochloride are added dropwise during an hour while stirring and cooling at 20–30° C. Before instilling the sulfochloride, 2 parts by weight of powdered sodium hydroxide are added and then 4 parts by weight thereof are introduced in portions of 1 part by weight each at intervals of 15 minutes. The whole is then stirred for a further 2 hours and then left to stand over night without stirring. 50 parts by volume of water and 25 parts by volume of benzene are then stirred in and the two layers separated. The aqueous layer is extracted with 50 parts by volume of benzene. The combined benzene extracts are agitated for 4 hours after adding 5 parts by volume of aqueous ammonia of 25% strength. 10 parts by volume of caustic soda solution of 10% strength are then added, well agitated and the benzene layer separated off and washed with 10 parts by volume of caustic soda solution of 10% strength and 10 parts by volume of half-saturated aqueous sodium chloride solution. All the water layers are extracted separately with the same 50 parts by volume of benzene. From the combined benzene solutions there are obtained 31.50 parts by weight of benzene-sulfonic acid ester of hepta-ethyleneglycol-monomethylether as an almost colorless oil.

95 parts by weight of the benzene sulfonic acid ester of heptaethyleneglycol-monomethylether are introduced dropwise into a solution of 4.6 parts by weight of sodium in 70 parts by volume of diethylene glycol in the course of 2 hours at 100° C. while stirring. The mixture is kept at 100° C. over night and then allowed to cool. Thereupon 100 parts by volume of water and 200 parts by volume of chloroform are stirred in and the two layers separated. The aqueous layer is extracted 4 times with 100 parts by volume of chloroform each time and each chloroform extract is washed with the same 100 parts by volume of water. The combined chloroform solutions yield 83 parts by weight of a residue after evaporation, from which there are distilled 70 parts by weight of nonaethylene glycol-monomethylether under a pressure of 0.002 mm. and at 185° C. as a colorless oil.

*Example 14*

4.42 parts of para-butylamino-benzoic acid ethyl ester are put with 13.6 parts of hepta-ethylene glycol monomethyl ether boiling at 160° C. at a pressure of 0.01 mm. of mercury, in a closed reaction vessel which is fitted with an adjustable inlet tube for solvents and a connection for distilling off in vacuo. In order to dry the mixture completely, it is heated for an hour at 100–105° C. and absolute xylene is introduced under the surface of the mixture in vacuo at a pressure of 12 mm. of mercury. There is thus a constant stream of xylene steam passing through the whole apparatus, which removes the last traces of moisture and any other volatile impurities. The xylene is condensed in a cooler. The whole is cooled to 20–30° C. and 0.06 part of sodium methylate dissolved in 0.6 part of methanol is added. Thereupon xylene is introduced again in vacuo at a temperature of 100–105° C. whereby all the methanol and the ethanol formed during re-esterification evaporates. The re-esterification is continued under these conditions until a specimen of the reaction mass is clearly soluble in cold water, which occurs after about 2-3 hours. There is now obtained in almost quantitative yield the ester of the formula

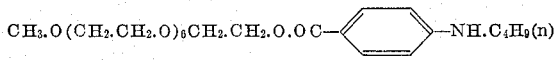

which still contains an excess of hepta-ethylene glycol monomethyl ether. The ester is purified by dissolving in benzene and being washed several times with a sodium carbonate solution of 5 per cent strength. It is advantageous to agitate all the washing solutions with fresh benzene. In this distribution between benzene and sodium carbonate solution the new ester remains in the benzene, the excess hepta-ethylene glycol monomethyl ether and a small amount of brown impurities are taken up by the dilute soda solution. By evaporating the dried and filtered benzene solution there is obtained the new ester in the form of a colorless to very faintly yellow oil which is easily soluble in most organic solvents with the exception of aliphatic hydrocarbons. The new ester is precipitated from a 10% aqueous solution when heated to about 30° C., but it dissolves again readily on cooling. The new ester is extremely suitable for use as an anesthetic. Aqueous solutions are stable and can be sterilized.

The hepta-ethylene glycol-monomethyl ether may be prepared as indicated in Example 13.

*Example 15*

1400 parts of polyethylene-glycol-monomethylether having an average molecular weight of 900 and 155 parts of para-n-butylamino-benzoic acid ethyl ester are heated in a flask for 3 hours in vacuo at a pressure of 12–15 mm. of mercury at a temperature of 140–145° C., while passing a fine stream of dry air through the homogeneous mixture by means of a capillary tube. After cooling, 35 parts by volume of a solution of 2-n sodium methylate dissolved in methanol are added to the completely dry mixture, and heated for 4 hours at 140–145° C., while a fine stream of dry air is again sucked through in vacuo at a pressure of 12–15 mm. of mercury. At the end of this time the re-esterification is practically completed. For purification the resulting mixture is taken up in benzene. A slight quantity of p-butylamino benzoic acid and the whole excess of polyethylene glycol mono-methyl ether is removed from the benzene solution by agitation with saturated sodium bicarbonate solution several times. By evaporation of the benzene solution and drying the residue there are obtained 700 parts of a practically pure ester of the formula

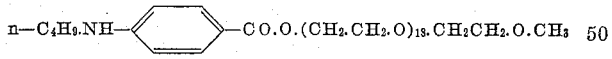

wherein 18 is an average value, in the form of a soft colorless wax which is readily soluble in most organic solvents with the exception of aliphatic hydrocarbons, and, at a temperature below 70° C., also in water.

Before using the new ester for therapeutic purposes it can be purified as follows: An aqueous solution of 12% strength is stirred well with the same quantity of ether free from peroxide; after allowing the mixture to stand for a long time at 0 to 10° C. the clear, aqueous layer is drained off, and the ether dissolved therein removed by evacuation. The aqueous solution is agitated for a short time with a little active carbon. After filtering through kieselguhr a solution is obtained which can be used for injections directly after being diluted with water to the desired concentration. The dry substance can be easily isolated from the aqueous solution by extraction with chloroform, evaporation and drying in vacuo.

What is claimed is:

1. The new esters of the formula

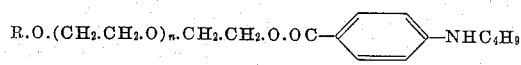

wherein $n$ is an integer from 7–18 and R stands for a member selected from the group consisting of hydrogen and an alkyl group having at most 6 carbon atoms.

2. The new esters of the formula

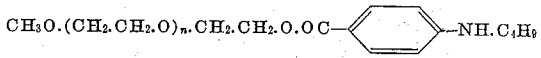

wherein $n$ is an integer from 16–18.

3. The new ester of the formula

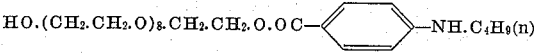

4. The new ester of the formula

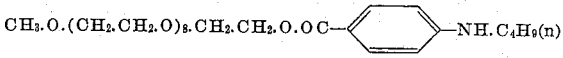

5. The new ester of the formula

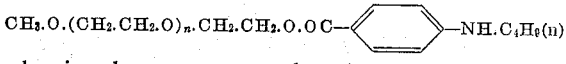

wherein $n$ has an average value of about 18.

6. The new ester of the formula

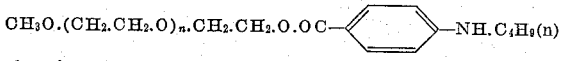

wherein $n$ has an average value of about 16.

No references cited.